W. H. PARHAM.
VEHICLE WHEEL.
APPLICATION FILED FEB. 28, 1914.

1,163,258.

Patented Dec. 7, 1915.

Witnesses

Inventor
William H. Parham,
By E. B. Stocking
Attorney

UNITED STATES PATENT OFFICE.

WILLIAM H. PARHAM, OF KNOXVILLE, TENNESSEE.

VEHICLE-WHEEL.

1,163,258.   Specification of Letters Patent.   Patented Dec. 7, 1915.

Application filed February 28, 1914. Serial No. 821,799.

*To all whom it may concern:*

Be it known that I, WILLIAM H. PARHAM, a citizen of the United States of America, residing at Knoxville, in the county of Knox and State of Tennessee, have invented certain new and useful Improvements in Vehicle-Wheels, of which the following is a specification, reference being had therein to the accompanying drawing.

This invention relates to certain new and useful improvements in resilient wheels especially adapted to be used in connection with motor vehicles of all kinds; the object being to provide a resilient wheel in the nature of a pneumatic wheel, the frame thereof being formed of a casing forming a chamber to contain compressed air which is inclosed therein by an impervious tire casing forming the tread of the wheel, whereby a resilient wheel is formed having a volume of air the size of the wheel in order to reduce the vibration on the vehicle when traveling over obstructions, as the flexible impervious tire will adapt itself to unevenness in the road or ground and absorb the shock, whereby the life of the vehicle and tire will be greatly increased.

Another object of the invention is to provide a resilient wheel which is exceedingly simple and cheap in construction, the same being so formed that a strong and durable wheel is constructed which is formed of few parts so mounted and arranged in respect to each other and connected together, that they can be quickly separated in order to reach the interior of the wheel in order to make a repair, if necessary.

I am aware that wheels have been constructed with annular air chambers in order to form a cushion, but in no instance am I aware that a wheel in its entirety, has been constructed in the form of an air chamber having its peripheral edge open in which is arranged a cushioning member carrying side flaps for closing the air chamber in order to provide a pneumatic wheel containing a volume of air equal in size, to the wheel.

Other and further objects and advantages of the invention will be hereinafter set forth and the novel features thereof defined by the appended claims.

Figure 1:
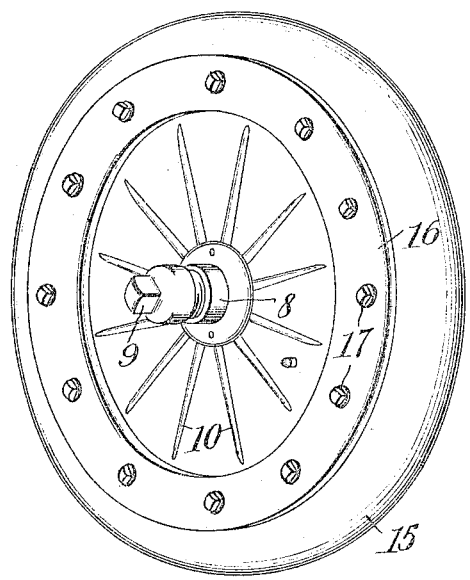
Figure 2:
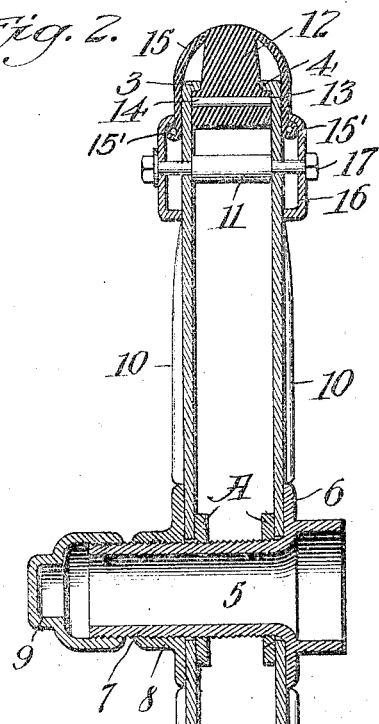
Figure 3:
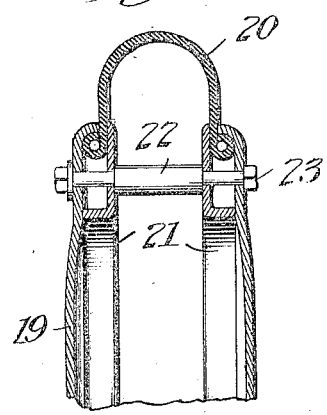

In the drawings—Figure 1, is a perspective of my improved construction of wheel; Fig. 2, is a vertical section showing the arrangement of fastening the impervious side flaps in position; and Fig. 3, is a detail section of a slightly modified form of fastening the casing to the wheel-frame.

Like numerals of reference refer to like parts in the several figures of the drawings.

In carrying out my invention, I employ a wheel-frame in the form of a hollow casing comprising a pair of spaced disks 1 and 2 provided with peripheral laterally projecting annular flanges 3 and 4 for the purpose hereinafter fully described. The disks 1 and 2 are provided with central apertures through which extends a hub 5 adapted to receive the axle, said hub being provided with an annular flange 6 engaging the disk 2 as clearly shown in Fig. 2. The hub is provided with a threaded portion 7 on which is mounted a flange nut 8 co-acting with the disk 1 for securing the disk in position upon the hub as clearly shown in Fig. 2; the outer end of said hub being inclosed by an ordinary cap nut 9. While I have shown and described this particular manner of securing the hub in position within the disk to receive the axle, I wish it to be clearly understood that various other forms of fastening means can be employed without departing from the spirit of my invention; the fundamental principle being to provide a rigid hub in connection with a rigid casing forming the wheel-frame.

The disks 1 and 2 are provided with radial reinforcing ribs 10 arranged as clearly shown in Fig. 1 in order to strengthen the wheel and to give the same the appearance of spokes. The disks are spaced apart adjacent their outer edges by shoulder bolts 11 which hold the disks in proper position in respect to each other and provide means for fastening the clencher rings, which will be later described, in position.

In the form shown in Figs. 1 and 2, the annular peripheral opening formed between the disks constituting the air chamber, is inclosed by a solid rubber cushioning tire member 12, which is provided with annular shoulders 13 reinforced by bolts 14 fitting snugly between the disks and co-acting with the peripheral flanges 3 and 4 for limiting the outward movement of the cushioning tire member. The inward movement of the cushioning tire member, is limited by the spacing bolts 11 forming stops when the tire is compressed in order to support the load.

The solid rubber tire 12 has formed integral therewith, impervious side flaps 15; the marginal edges of which, extend down over the edges of the disks 1 and 2 and are provided with the usual marginal enlargements 15′ as clearly shown in Fig. 2, in order to provide means for clamping the same in position thereon.

While I have used the term "side flaps" in connection with the cushioning member, they in reality, form a casing so as to inclose the outer edges of the disk and the cushioning member and by forming the side flaps separate from the cushioning member, a substantial casing would be formed so as to inclose the air chamber to prevent any leakage of the air which might escape around the cushioning member and at the same time, a protection for the cushioning member is formed.

The clamping means herein shown, is in the form of annular channel rings 16 having apertures registering with the threaded ends of the bolts 11 through which said bolts extend, and said clamping rings are clamped against the outer faces of the disk and the overlapping portions of the tire casing by nuts 17, whereby an air-tight joint is formed over the annular opening of the spaced disks so as to form a complete air chamber between the disks to receive air under pressure; one of the disks being provided with an inflating valve 18, as shown.

The form of tire shown in Figs. 1 and 2 is especially adapted to be used in connection with vehicle wheels used on motor trucks and the like in which exceedingly heavy loads are carried and by the addition of the cushioning rubber tire member 12, the load is supported thereby when the pressure exerted upon the tire exceeds the pressure of air within the wheel casing and while I have shown this additional tire member used in connection with an impervious casing, I wish it to be clearly understood that the fundamental principle of my invention is to provide a wheel-frame in the form of a casing to provide an air chamber which is closed by a flexible tire casing.

I have also shown the manner of securing the tire casing in position upon the disks, but it is of course understood that various other forms of tire casings could be employed, such as are now in use and the clencher or clamping rings could be changed to conform to the construction of tire casing being used.

Suitable nuts A are arranged on the hub forming stops, to limit the inward movement of the disks, against which the disks are clamped by the flange 6 and the flange nut 8 in order to form a rigid construction for connecting the rigid casing to the rigid hub, as this means of fastening the hub in position, is exceedingly simple and cheap in construction.

In the form of wheel shown in Fig. 3, which is substantially the reversal of the construction shown in Figs. 1 and 2, with the exception of the additional cushioning tire member, I illustrate a wheel especially adapted to be used on pleasure motor vehicles, formed of a pair of disks 19, constructed substantially as shown in Figs. 1 and 2 and instead of clamping the flexible impervious tire casing 20 in position upon the outer faces of the disk, the same is clamped under the peripheral flanges by flanged annular clamping rings 21 arranged on the shoulder bolts 22 which are clamped in position over the tire and to the disk forming the wheel-frame by nuts 23 as clearly shown, and while I have shown in this construction, means for clamping the impervious tire casing to the disks for closing the peripheral space between the disks forming the casing, I do not wish to limit myself to any particular manner of clamping the casing in position, as various other clamping means can be employed without departing from the spirit of my invention.

By constructing a pneumatic wheel as herein shown and described, and especially as shown in Fig. 3, one of the disks can be readily removed in order to allow the interior of the wheel to be reached in order to make a repair to the flexible tire casing in case of a puncture or an injury thereto, of any kind.

In the form of construction as disclosed in Figs. 1 and 2, a substantially puncture-proof pneumatic wheel is formed, as the solid rubber cushioning tire member 12 is so mounted between the disks that a substantially air-tight joint is formed which provides a tread member of such a thickness and of such a nature that it will almost be impossible for the same to be injured to such an extent as to allow the air to escape from the annular chamber of the casing, even if the tire casing carried thereby, should become injured in any way; the tire casing being employed in order to prevent mud and dirt from reaching the interior of the rigid casing.

While I have shown and described several constructions of flexible tires to be used in connection with a wheel-frame formed of a rigid casing constituting an air chamber I wish it to be clearly understood that I do not limit myself to any particular construction of tire, as various forms of tires could be used without departing from the spirit of my invention; the fundamental principle being to provide a wheel having a rigid air chamber with a yielding tread surface.

From the foregoing description, it will be seen that I have provided in reality, a pneumatic wheel containing a volume of air equal in size to the size of the wheel, said volume of air being contained within the casing constituting the wheel-frame by an impervious tire casing which receives and absorbs the vibration to which the wheel is subjected by passing over obstructions.

It will also be seen that a pneumatic wheel has been provided in which an annular air chamber is formed communicating directly with the tire casing in order to form a cushioning medium of air for the wheel which provides an exceedingly resilient wheel.

I claim:

1. A vehicle wheel, comprising a frame formed of spaced disks provided with peripheral inwardly projecting flanges, a rigid hub arranged within said disks, a cushioning member arranged between said disks having lateral shoulders coöperating with the peripheral flanges of said disks forming a peripheral air-tight wall for the chamber formed thereby, reinforcing members extending transversely through the shoulder portions of said cushioning members, said cushioning members having a tread portion extending outwardly beyond the peripheral edges of said disks, and side flaps carried by said cushioning member having their marginal edges connected to the outer faces of said disks.

2. A vehicle wheel, comprising a rigid hub, disks surrounding said hub provided with peripheral flanges, said disks forming an annular chamber, means for spacing said disks adjacent their outer edges, a cushioning member slidably mounted between said disks forming a peripheral air-tight wall for said chamber, side flaps carried by said cushioning member extending over the free edges of said disks, channel rings for clamping said side flaps against the outer faces of said disks, and a valve for inflating the air chamber formed by said disks and cushioning member.

3. A vehicle wheel, comprising a threaded rigid hub provided with an annular flange adjacent one end, disks surrounding said hub provided with radial ribs, shouldered bolts for spacing said disks adjacent their outer edges, spaced stop nuts mounted upon said hub engaging the inner faces of said disks, a flange nut mounted on the opposite end of said hub, coöperating with one of said disks, said disks and hub forming an annular air chamber, a cushioning member slidably mounted between said disks having a portion extending outwardly beyond the peripheral edges thereof and forming a peripheral air-tight wall for said chamber, impervious side flaps carried by said cushioning member extending over the free edges of said disks, means for securing the free edges of said side flaps against said disks, and a valve for inflating the chamber formed by said disks and cushioning member.

4. A vehicle wheel, comprising a rigid hub, disks surrounding said hub, means for spacing said disks adjacent their outer edges, said disks and hub forming an annular air chamber, a cushioning member slidably mounted between said disks, having a portion extending outwardly beyond the peripheral edges thereof and forming a peripheral air-tight wall for said chamber, impervious side flaps carried by said cushioning member extending over the free edges of said disks, and a valve for inflating the chamber formed by said disks and cushioning member.

In testimony whereof I hereunto affix my signature in the presence of two witnesses.

WILLIAM H. PARHAM.

Witnesses:
N. CURTIS LAMMOND,
REO P. WRIGHT.